United States Patent [19]

Lipschutz

[11] 4,118,960
[45] Oct. 10, 1978

[54] ADJUSTABLE LOCKING DEVICE IMMOBILIZED BY A SAFETY LOCK

[75] Inventor: Paul Lipschutz, Croissy, France

[73] Assignee: Neiman S.A., Courbevoie, France

[21] Appl. No.: 813,851

[22] Filed: Jul. 8, 1977

[30] Foreign Application Priority Data

Jul. 22, 1976 [FR] France ................... 76 22314

[51] Int. Cl.² ............................................. E05B 69/00
[52] U.S. Cl. ........................................... 70/59; 70/19; 70/461
[58] Field of Search ............... 70/14, 15, 19, 59, 60, 70/61, 62, 461

[56] References Cited

U.S. PATENT DOCUMENTS

| 1,156,739 | 10/1915 | Backus | 70/60 |
| 3,529,451 | 9/1970 | McOsker | 70/59 |
| 3,896,643 | 7/1975 | Kawakami | 70/59 |

*Primary Examiner*—Robert L. Wolfe
*Attorney, Agent, or Firm*—William Anthony Drucker

[57] ABSTRACT

The adjustable locking device, particularly suitable for securing a motor-cyclists's helmet to his machine when not in use, comprises a housing having fixed and movable portions to form a clamp between which portions the rim of a helmet may be gripped. A toothed element mounted in the housing serves to locate the movable position and a further toothed element may be brought into engagement with the former by rotation of a key operated lock.

5 Claims, 1 Drawing Figure

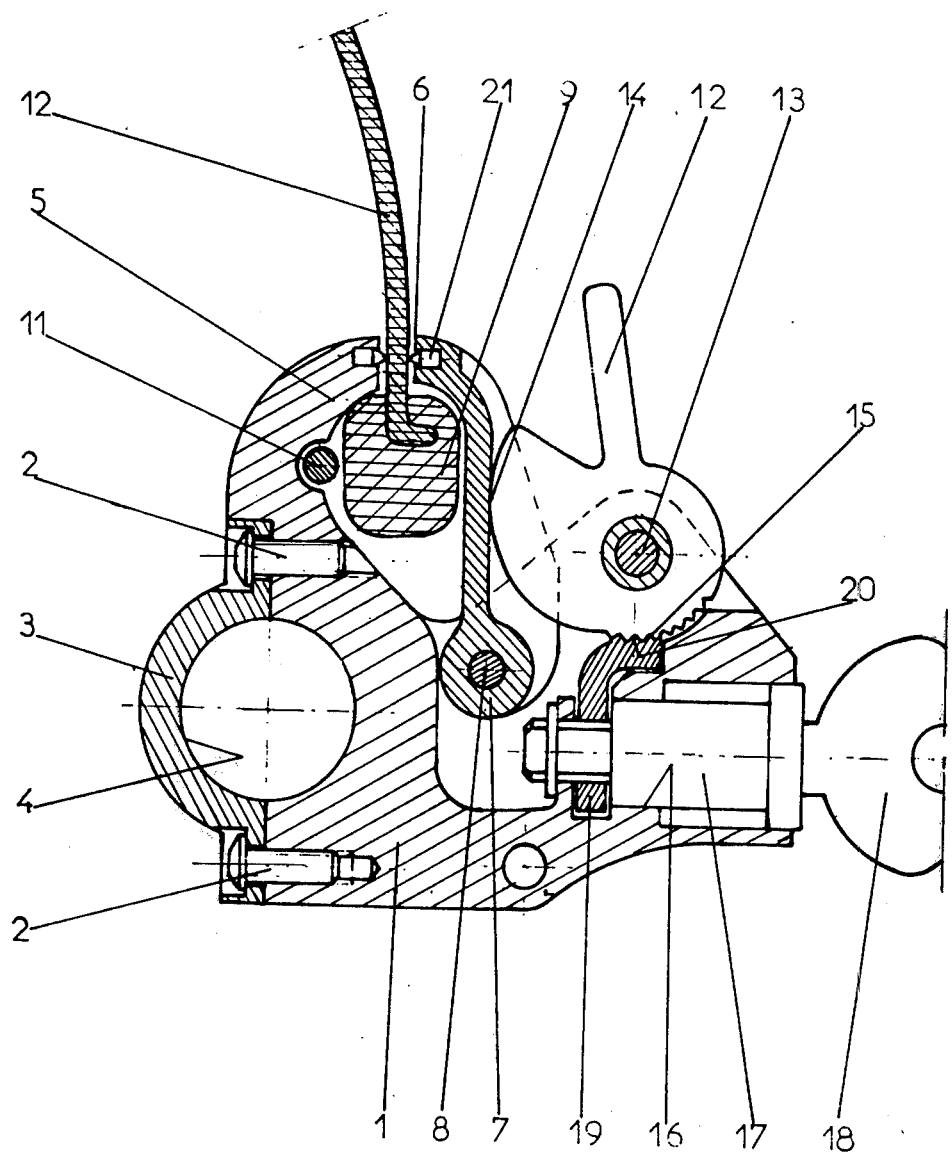

ADJUSTABLE LOCKING DEVICE IMMOBILIZED BY A SAFETY LOCK

BACKGROUND TO THE INVENTION

This invention relates to an adjustable locking device controlled by a safety lock.

A device of this kind is particularly useful for the locking of elements capable of occupying varying positions not defined in advance, such as a gripping element necessitating adjustment of the play between the ends of its branches, a regulating knob for a hydraulic feed or a potentiometer, a rack, or any adjustable elements of machine tools or other apparatus.

SUMMARY OF THE INVENTION

According to the invention we provide an adjustable locking device comprising a housing, a safety lock mounted thereon, a movable part of said lock having a first toothed element, a second toothed element, to be immobilized by said lock, mounted on said housing, the teeth of said two toothed elements being in engagement when the lock is in its locking position, and a clamping element to be locked carried by the housing, wherein the second element comprises a pivoting lever provided with a cam profile interacting with the clamping element.

BRIEF DESCRIPTION OF DRAWING

The invention will be clearly understood from a study of the following description by reference to the accompanying drawing, of which the single diagram is a sectional view of an anti-theft device for a motorcyclist's helmet fitted with a device according to one version of the invention.

DESCRIPTION OF PREFERRED EMBODIMENT

The device shown in the drawing comprises a support 1 to which is affixed, by means of screws 2 which cannot be unscrewed, a collar 3 providing a cylindrical passage 4 serving to enable the anti-theft device to be mounted on the handlebars, the frame or the luggage rack etc, of a motor cycle. The support 1 comprises a prolongation 5 in the form of a nosepiece with which the end 6 of a jaw 7 interacts, the latter being mounted so that it can pivot about a shaft 8 integral with the support 1. The nosepiece 5 and the end 6 form a vice in which the peripheral flange 9 of a helmet 10 can be gripped. The end of an anti-theft device for the motorcycle, such as an end ring 11 of a chain (not shown in the drawing), can likewise be introduced into the vice.

The rotation of the jaw 7 is controlled by a lever 12 mounted so that it can pivot about a shaft 13 parallel to the shaft 8 and integral with the support 1. The lever 12 has a cam profile 14 acting on the jaw 7 in order to cause its end 6 to approach the nosepiece 5 in the course of the rotation of the lever 12. A spring (not shown) can be provided to return the jaw 7 in the opposite direction. The lever 12 comprises a toothed sector 15. The ends 5 and 6 of the jaws are provided with points 21 which penetrate the material of which the helmet consists.

The support 1 also includes a cylindrical boring 16 in which is journalled a rotor 17 belonging to a safety lock and actuated by a key 18. The rotor 17 comprises a lateral finger 19 provided with teeth 20, the entire assembly being so arranged that the teeth 20 engage the teeth of the toothed sector 15 of the lever 12 when the rotor is in the locking position, (the position shown in the drawing) and locking the lever 12, which then cannot be displaced. This locking action is effected in the position which the lever 12 occupies when the rotor 17 reaches the locking position, thanks to the interaction between the teeth 20 and those of the toothed sector 15, which are opposite one another when the said position is reached. The locking position is thus adjustable. When the rotor 17 does not occupy the locking position the teeth 20 are not opposite those of the toothed sector 15 and the lever 12 is free.

In the device to which the invention relates a sliding element fitted with a rack may be used in place of the control lever 12.

The device is strong due to the fact that a number of teeth of the toothed sector 15 interact at any one time with a number of teeth 20.

In the case of the machine tool the teeth 20 may interact with a rack integral with the carriage, in order to lock the latter in a certain position and prevent the latter from being changed by a person not having the key of the lock.

I claim:
1. An adjustable locking device comprising:
   (a) a housing,
   (b) a safety lock mounted thereon,
   (c) a movable part of said lock having a first toothed element,
   (d) a second toothed element, to be immobilized by said lock, mounted on said housing, the teeth of said two toothed elements being in engagement when the lock is in its locking position, and
   (e) a clamping element to be locked carried by the housing, wherein the second element comprises a pivoting lever provided with a cam profile interacting with the clamping element.
2. A device according to claim 1, wherein the second element is integral with the clamping element.
3. A device according to claim 1, wherein the second element is provided with a rack.
4. A device according to claim 1, wherein the first element comprises a radial finger provided with teeth.
5. A device according to claim 1 wherein clamping element is formed as a joint of a vice, said joint being capable of being immobilised by said second toothed element.

* * * * *